United States Patent Office 3,523,454
Patented Aug. 11, 1970

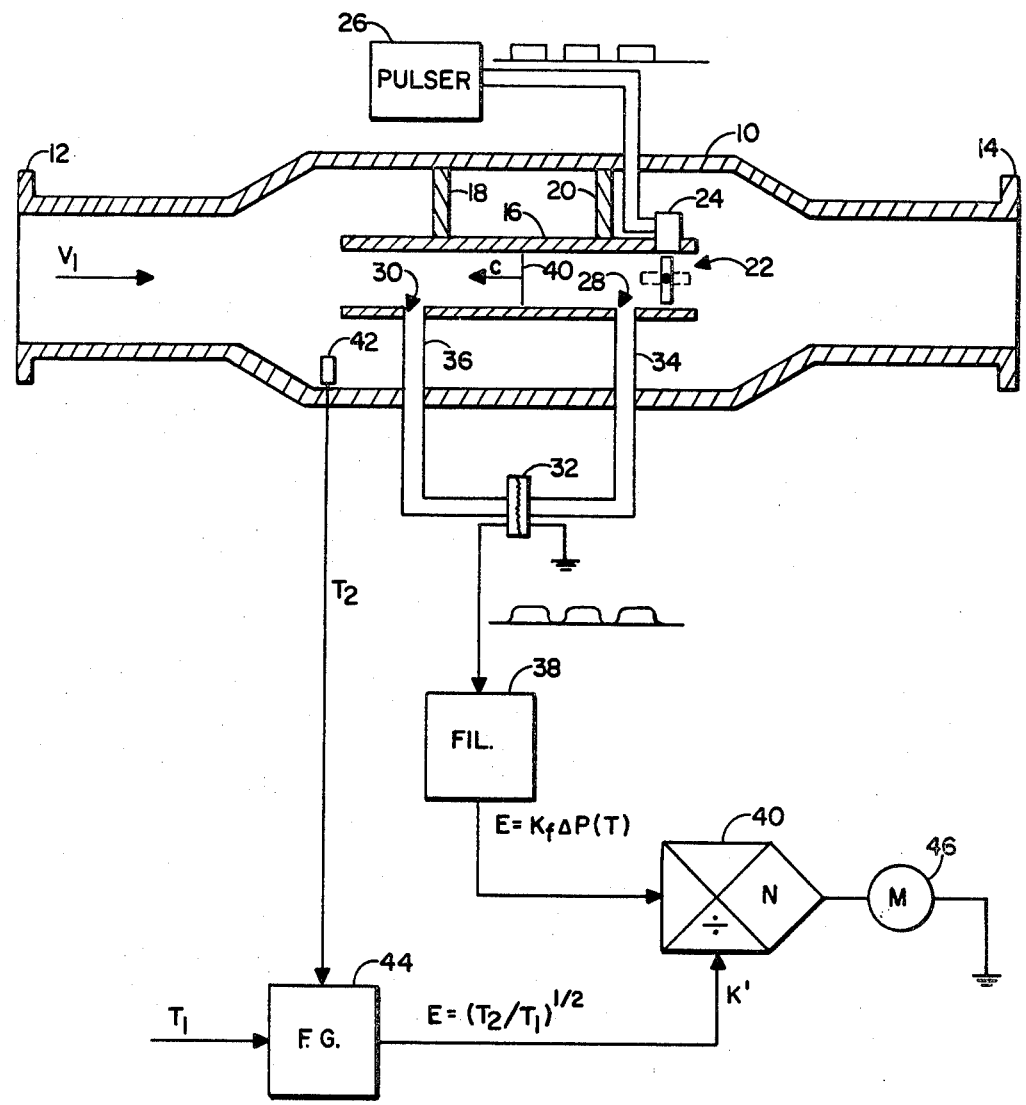

3,523,454
CONTROL APPARATUS
Jerome J. Rusnak, St. Paul, Minn., assignor to Honeywell Inc., Minneapolis, Minn., a corporation of Delaware
Filed Jan. 2, 1968, Ser. No. 694,911
Int. Cl. G01f 1/00
U.S. Cl. 73—205                                     5 Claims

ABSTRACT OF THE DISCLOSURE

A flowmeter having a sampling tube in the flow stream with a valve at one end of the tube which is periodically closed, obstructing the flow and thereby generating a shockwave. The change in pressure associated with the shockwave, which is a function of the mass flow rate, is sensed by a transducer which provides an electrical signal proportional to the mass flow rate.

FIELD OF THE INVENTION

The field of the invention is flow measuring apparatus. More particularly it is apparatus for measuring the mass rate of flow.

SUMMARY

The invention is a flowmeter having a sampling tube mounted parallel with the mass flow in a conduit. A valve is mounted within the tube at its downstream end. The valve has two positions: an open position in which the flow through the tube is virtually unobstructed and a closed position in which the flow through the tube is virtually completely obstructed. When the valve is rapidly closed, obstructing the flow within the sampling tube, a shockwave is generated which travels upstream within the tube. The pressure associated with the shockwave is greater than that associated with the unobstructed flow. The change in pressure is given by the equation $$\Delta P = \rho C \Delta V = K \frac{dm}{dt}$$

where $\Delta P$ is the change in pressure, $\rho$ is the density of the flow, $C$ is the velocity of sound in the flow, $K$ is a constant, and $dm/dt$ is the mass flow rate. The change in pressure is sensed by a transducer which is connected to a pair of ports in the sampling tube by a pair of conduits. The transducer also converts the changes in pressure into electrical signals. The electrical signals are used to drive an indicator calibrated in terms of mass flow rate.

BRIEF DESCRIPTION OF THE DRAWING

The only drawing is a simplified schematic representation of the flowmeter illustrating the theory of operation upon which it is based.

DESCRIPTION OF THE PREFERRED EMBODIMENT

A cross sectional view of a shockwave mass flowmeter comprising the invention is shown in the drawing. The flowmeter comprises a section of conduit 10 adapted to be inserted in a conduit, carrying a fluid flow, by means of flanges 12 and 14. It will be assumed that the fluid flow in conduit section 10 is from left to right and is at velocity $V_1$. A sampling tube 16 is mounted within conduit section 10 parallel to the normal direction of fluid flow in the conduit by means of a pair of struts 18 and 20. A valve means 22 is mounted in the downstream end of sampling tube 16 and has two positions. Valve means 22 has an open position and a closed position. As illustrated, valve means 22 is shown in its closed position. The open position of valve means 22 is shown by means of dashed lines. When valve means 22 is in its open position, the fluid flow through sampling tube 16 is virtually unobstructed. On the other hand, when valve means 22 is in its closed position, as shown, the fluid flow through sampling tube 16 is virtually completely obstructed. Valve means 22 is closed and opened by an electromagnet 24 mounted in sampling tube 16 adjacent to valve means 22. Valve means 22 is normally biased open, but is closed whenever electromagnet 24 is energized by an electrical pulse from a pulser 26. Pulser 26 provides a train of electrical energy pulses. Obviously, various other schemes can be devised for opening and closng valve means 22.

First and second ports 28 and 30, respectively, are located in the wall of sampling tube 16. The first port 28 is a short distance upstream from valve means 22 whereas the second port 30 is at a greater distance upstream from the valve means 22. A pressure transducer 32 is connected to ports 28 and 30 by means of conduits 34 and 36, respectively. Transducer 32 senses the pressure differential between port 28 and port 30 and converts it to an electrical signal. The electrical signal is used to drive a meter which indicates the mass flow rate within conduit 10. Differential pressure transducer 32 may be a piston or a diaphragm type but many other types are well known and could be used. Also conduits 34 and 36 may be used to support tube 16 in which case struts 18 and 20 may be not necessary.

The velocity of the fluid flow entering conduit section 10 at the left end is $V_1$. The pressure associated with the fluid at this point is nominal and will be assumed to be zero. When valve means 22 is in its open position these conditions also prevail within sampling tube 16. That is, the velocity is $V_1$ and the pressure is about zero. When valve means 22 is closed, as shown, a shockwave is generated which travels upstream to the left within sampling tube 16. The shockwave is shown as a vertical line 40. It travels with a velocity $C$ which is the velocity of sound in the particular fluid comprising the flow. To the left of the shockwave 40 the velocity of the fluid is $V_1$ and the pressure is about zero. To the right of the shockwave 40 the velocity of the fluid is zero and the pressure is given by the equation $P = \rho C \Delta V$, where $\rho$ is the density of the flow and $\Delta V$ is the difference between the fluid velocity on the upstream side of shockwave 40 and that on the other downstream side of shockwave 40. Since the velocity on the downstream stream side of shockwave 40 is about equal to zero, it is obvious that $\Delta V$ is equivalent to $V_1$. The difference in pressure between that on the upstream side of the shockwave and that on the downstream side, $P$, is given by the equation $$P = \rho C \Delta V \text{ or } P = K \frac{dm}{dt}$$

where $K$ is a constant and $dm/dt$ is the mass flow rate of the fluid within conduit 10. Transducer 32 senses the differential pressure associated with ports 28 and 30 and converts this differential pressure to an electrical signal. The electrical signal output of transducer 32 is shown as a series of pulses corresponding with the pulses generated by pulser 26. However, the amplitude of the electrical pulses developed by transducer 32 is proportional to the change in pressure $P$ and hence is also proportional to the mass flow rate $dm/dt$.

The pulses generated by transducer 32 are applied to a filter 38 which develops a D-C voltage $E = K' \Delta P(T)$ at its output. $K'$ is a constant introduced by filter 38 and $\Delta P(T)$ represents a temperature dependent pressure differential. This temperature dependence is illustrated as follows: If $P_1$ is the pressure differential at some reference temperature $T_1$, and the temperature becomes $T_2$, then $P_2=P_1(T_2/T_1)^{1/2}$, assuming that $\rho$ and $\Delta V$ ($=V_1$) remain constant. This occurs because the velocity of sound, C, in the fluid is a function of temperature, i.e.

$$\frac{C_2}{C_1}=\left(\frac{T_2}{T_1}\right)^{1/2}$$

Thus it is evident that some kind of temperature compensation is necessary if the fluid is to have a variable temperature. This is done by dividing $\Delta P(T)$ by a factor $(T_2/T_1)^{1/2}$.

A temperature sensor 42 is mounted inside conduit 10 and exposed to the fluid. It develops a D-C voltage proportional to the temperature $T_2$ of the fluid. This D-C voltage is applied to one input of a function generator 44. Another D-C voltage proportional to the reference temperature $T_1$ is applied to the other input of function generator 44. The output of function generator 44 is a D-C voltage which is proportional to $(T_2/T_1)^{1/2}$. Function generator 44 may be a computer servomechanism including a function potentiometer, or an electronic circuit such as a diode function generator. See, e.g., Computer Handbook, Husky and Korn, McGraw-Hill, New York, 1961, pp. 1–9, Figure 1.2.7(a) and pp. 1–8, Figure 1.2.5(b).

The output of filter 38 is applied to one input of a divider 40 and the output of function generator 44 is applied to the other output. The output of the divider is proportional to a differential pressure, $\Delta P$, which is compensated for changes in temperature. Divider 40 may be an electronic multiplier in a built-in division mode. See, e.g., Husky and Korn, pp. 1–8, Figure 1.2.6(c). The temperature compensated signal developed by divider 40 is applied to a meter 46 which is calibrated in terms of mass flow rate $dm/dt$.

Obviously, if the fluid temperature does not vary the signal at the output of filter 38 can be applied directly to meter 46. In fact, the pulses from transducer 32 could be applied directly to an average reading meter.

Although only a single embodiment has been shown, there may be quite likely other embodiments that are within the scope of the invention. With this in mind the invention is to be limited only by the following claims.

I claim:
1. A mass rate flowmeter comprising:
   a section of conduit adapted to be inserted in a fluid flowstream;
   a sampling tube mounted in the conduit parallel to the normal direction of fluid flow in the conduit;
   a valve means mounted at the downstream end of the sampling tube, the valve means having two positions, open and closed, the fluid flow through the sampling tube being essentially unobstructed in the open position and essentially completely obstructed in the closed position;
   means for closing and opening the valve means; and
   means connected to the sampling tube entirely upstream from the valve means and responsive to the changes in pressure due to a shockwave in the sampling tube which occurs after the valve means is closed, the changes in pressure being a function of the mass flow rate of the fluid within the conduit.

2. The apparatus of claim 1 wherein the means for opening and closing the valve means is an electromagnet which is periodically energized and when energized exerts a force on the valve means, thereby closing it, the valve means biased and returning to its open position when the electromagnet is not energized.

3. The apparatus of claim 1 wherein the means last mentioned therein comprises:
   a differential pressure transducer, connected by a pair of conduits to a pair of ports opening into the interior of the sampling tube at points upstream from the valve means, the pressure transducer responsive to pressure changes within the sampling tube and converting them to electrical signals; and
   a meter responsive to the electrical signals.

4. The apparatus of claim 3 wherein means are provided to temperature compensate the electrical signals.

5. A mass rate flowmeter, comprising:
   a section of conduit adapted to be inserted in a fluid flowstream;
   sampling means mounted in the conduit including means for momentarily obstructing the fluid flow entirely downstream from the sampling means, the momentary obstruction causing a pressure shockwave to be developed which travels upstream and is detected by the sampling means, the change in pressure associated with the shockwave being a function of the mass flow rate of the fluid, the sampling means also developing a signal which is proportional to the pressure change; and,
   indicator means actuated by the signal developed by the sampling means.

References Cited

UNITED STATES PATENTS

| | | | |
|---|---|---|---|
| 1,645,624 | 10/1927 | Roucka | 73—207 |
| 3,349,619 | 10/1967 | Millar | 73—205 |

JAMES J. GILL, Primary Examiner

J. K. LUNSFORD, Assitant Examiner